US012215252B2

(12) United States Patent
Tisserat et al.

(10) Patent No.: US 12,215,252 B2
(45) Date of Patent: Feb. 4, 2025

(54) ADHESIVE COMPOSITIONS AND METHODS OF ADHERING ARTICLES TOGETHER

(71) Applicant: The United States of America, as represented by the Secretary of Agriculture, Washington, DC (US)

(72) Inventors: Brent Tisserat, Washington, IL (US); Rogers E. Harry-O'Kuru, Peoria, IL (US)

(73) Assignee: The United States of America, as represented by the Secretary of Agriculture, Washington, DC (US)

(*) Notice: Subject to any disclaimer, the term of this patent is extended or adjusted under 35 U.S.C. 154(b) by 438 days.

(21) Appl. No.: 17/348,922

(22) Filed: Jun. 16, 2021

(65) Prior Publication Data

US 2021/0395585 A1  Dec. 23, 2021

Related U.S. Application Data

(60) Provisional application No. 63/041,254, filed on Jun. 19, 2020.

(51) Int. Cl.
 *C09J 197/00* (2006.01)
 *C08L 97/00* (2006.01)
 (Continued)

(52) U.S. Cl.
 CPC ............ *C09J 197/00* (2013.01); *C08L 97/00* (2013.01); *C09J 5/06* (2013.01); *C09J 11/06* (2013.01); *C09J 2497/00* (2013.01)

(58) Field of Classification Search
None
See application file for complete search history.

(56) References Cited

U.S. PATENT DOCUMENTS

| | | | | |
|---|---|---|---|---|
| 2,752,314 A | * | 6/1956 | Clopton | C08L 21/00 44/307 |
| 2004/0167099 A1 | * | 8/2004 | Lawter | A61K 47/36 514/3.3 |

(Continued)

FOREIGN PATENT DOCUMENTS

CN          108424734 A      8/2018

OTHER PUBLICATIONS

Exocarp—Definition (Year: 2024).*
(Continued)

*Primary Examiner* — Peter A Salamon
(74) *Attorney, Agent, or Firm* — John D. Fado; Maria Restrepo-Hartwig

(57) ABSTRACT

Adhesive compositions containing (1) one or two adhesive compositions produced from the fruit but not the seeds of Osage orange fruit and (2) a known adhesive. The one or two adhesive compositions produced from the fruit but not the seeds of Osage orange fruit are produced by a process involving drying the cut peel and mesocarp but not the seeds of the fruit of Osage orange to produce dried peel and mesocarp, milling the dried peel and mesocarp to produce milled peel and mesocarp, extracting the milled peel and mesocarp with an organic solvent (e.g., hexane) or a polar aprotic solvent (e.g., ethyl acetate) to produce the first adhesive composition, and optionally wherein the amorphous layer between the polar aprotic solvent and the milled peel and mesocarp is the second adhesive composition.

5 Claims, 2 Drawing Sheets
(1 of 2 Drawing Sheet(s) Filed in Color)

(51) Int. Cl.
*C09J 5/06* (2006.01)
*C09J 11/06* (2006.01)

(56) References Cited

U.S. PATENT DOCUMENTS

| | | | |
|---|---|---|---|
| 2007/0166347 A1* | 7/2007 | Slepian | A61B 17/1219 |
| | | | 424/423 |
| 2009/0098203 A1* | 4/2009 | Lawter | A61P 1/02 |
| | | | 424/484 |
| 2011/0311787 A1* | 12/2011 | Akesson | B32B 27/36 |
| | | | 156/60 |
| 2019/0016895 A1* | 1/2019 | Tisserat | C08L 97/005 |
| 2019/0119851 A1* | 4/2019 | Tisserat | D21C 3/02 |

OTHER PUBLICATIONS

Mesocarp—Definition (Year: 2017).*
International Search Report dated Oct. 1, 2021.
George, B. et al. "Plant-derived bioadhesives for wound dressing and drug delivery system", Fitoterapia, 2019, vol. 137, article 104241, pp. 1-14.

* cited by examiner

ADHESIVE COMPOSITIONS AND METHODS OF ADHERING ARTICLES TOGETHER

REFERENCE TO RELATED APPLICATION

This application claims the benefit of U.S. Provisional Application No. 63/041,254, filed 19 Jun. 2020, which is incorporated herein by reference in its entirety.

BACKGROUND OF THE INVENTION

Disclosed are adhesive compositions containing (1) one or two adhesive compositions produced from the fruit but not the seeds of Osage orange fruit and (2) a known adhesive. The one or two adhesive compositions produced from the fruit but not the seeds of Osage orange fruit are produced by a process involving drying the cut peel and mesocarp but not the seeds of the fruit of Osage orange to produce dried peel and mesocarp, milling the dried peel and mesocarp to produce milled peel and mesocarp, extracting the milled peel and mesocarp with an organic solvent (e.g., hexane) or a polar aprotic solvent (e.g., ethyl acetate) to produce the first adhesive composition, and optionally wherein the amorphous layer between the polar aprotic solvent and the milled peel and mesocarp is the second adhesive composition.

There is a great need to employ engineered wood as a building and construction material. Composite wood panels (CWPs) such as plywood, particleboard, hardboard, and medium density fiberboard are an important type of engineered wood. CWPs are usually derived from lumber by-products such as wood scraps and sawdust glued together. The market for engineered wood is growing at a compound annual growth rate (CAGR) of 26%. This trend is expected to continue through the 2020s (Markets&Markets.com, April 2015, Bioadhesive market by type (plant based, and animal based) by application (Packaging & Paper, construction, wood, personal care, medical, and others)—Global forecast to 2019, Report Code CH 3015). Petroleum-based adhesives (i.e., phenol formaldehyde (PF), urea formaldehyde (UF), and melamine urea formaldehyde (MUF)) provide the binding glue necessary for engineered wood. Unfortunately, these adhesives emit formaldehyde which are a serious health concern to the fabricators, installers, and end-users. There is much interest in development of bio-based adhesives, which are formaldehyde-free, to replace petroleum-based adhesives (Gross, E., 2011, Getting Stuck in, Chemistry World, rsc.org; Wrede, K., 2016, Progress in eco-friendly adhesives, European Coatings Journal, european-coatings.com; Markets&Markets.com, 2015; Pijak, J., 2016, This potato starch paper glue boasts no harmful additives, Trendhunter.com; Madsen, B., et al., Journal of Composite Materials, 45 (20): 2119-2131 (2011); Olympic-adhesives.com, 2016, Natural Adhesives, Olympic Adhesives, Inc; Dumé, B., 2016, 'Glue' in English ivy contains glycoprotein nanoparticles, nanotechweb.org; Nur Farahain, K., 2013, Jatropha oil based bio-adhesive for plywood application, Master's thesis, University Malaysia Pahang, http://umpir.ump.edu.; Verespej, M., DaniMer scaling up production of bio-based PHA resins, Plastic News, Jul. 5, 2011, Crain Communications, Inc., plasticsnews.com). The bio-adhesive market was valued at $6 billion in 2019 with a CAGR of 13% from 2014 to 2019.

Thus there is a great need to develop new bio-adhesives to satisfy the engineered wood market in the future (MarketsandMarkets.com, 2015; Wrede, 2016). Seed meals derived from soybeans, Jatropha, and cottonseed have been employed as adhesives to construct CWPs (Ong, H. R., et al., Applied Mech. Mater., 121-126:493-498 (2011); He, Z., and D. C. Chapital, J. Vis. Exp. (97): e52557 (2015); Gao, Q., et al., Bioresources 7 (4): 5622-5633 (2012); Morton, J., 1987, Carob. p. 65-69, IN: Fruits of warm climates. *Julia F. Morton*, Miami, FL, hort.purdue.edu). The adhesive properties of the seed meals are attributed to the presence of proteins which occur at relatively high levels (~30-35%) within these seeds (Frihart, C. R., Journal of adhesion science and technology, 23 (4): 601-617 (2009); Frihart, C. R., 2011a, Influence of soy type on wood bonding performance, Proceedings of the 34th annual meeting of the Adhesion Society, Feb. 13-16, 2011; Frihart, C. R., 2011b, Frihart, C. R., Forest Products J., 61 (1): 4-12 (2011b); Frihart, C. R., and S. Holly, Journal of Adhesion Science and Technology, 27 (18-19): 2043-2052 (2013); Frihart, C. R., et al, Ovalbumin as a Wood Adhesive, IN: The Adhesion Society's 37th Annual Meeting, Feb. 23-26, 2014, Bahia Resort Hotel, San Diego, CA; Frihart, C. R., and L. Lorenz, Forest Prod. J., 63 (3/4): 138-142 (2013); Ong et al., 2012; He and Chapital, 2015; Gao et al., 2012; Morton et al., 1987). Previous investigators have also noted that tree seed meal has adhesive properties (Smith and Perino, 1981).

Osage orange (OO) (*Maclura pomifera* (Raf.) Schneid., family Moraceae) is native to Texas and Oklahoma but has spread throughout most of the temperate regions of the U.S. (Smith, J. O. L., and J. V. Perino, Econ. Bot. 35 (1): 24-41 (1981)). OO trees are ubiquitous throughout the Midwest of the United States. It has been labeled invasive because of its hardiness and rapid growth once established (Invasive.org). It was originally employed in the 1800s as a boundary tree to delineate farms (Smith and Perino, 1981). OO is deciduous, fast-growing, and readily flowers to produce abundant fruits within a few years after planting. The fruits, referred to as "hedge-balls", are syncarps and are composed of drupelets fused into a globose, yellow-green structure that can grow up to 8-12 cm in diameter (Smith and Perino, 1981). The fruit has a rough surface peel and within the fruit is a pulp or mesocarp that contain a milky white sticky juice and numerous seeds occurring in an indeterminate ring. Within the seed ring is a hard-pithy region which attaches to the branch. The fruit may contain up to 200 seeds depending on environmental conditions and age of the tree. The seeds are edible to animals (PFAF.org, 2016, *Maclura pomifera*—(Raf.), C. K. Schneid, Plants for a Future). Several health products are derived from OO fruits that are currently sold as a dietary supplement either as freeze dried fruit powders or seed oil (Allorganichealth.blogspot.com, 2014, The health benefits of the Osage tree; Amazon.com, 2020a, *Maclura* Dried Hedge Apples (Osage Orange) Antioxidant herbal Supplement Capsule; Amazon.com, 2020b, *Maclura pomifera* essential gold oil Capsule, Antibacterial and Antifungal Natural oil drops, 1005 pure cold pressed Osage orange seed oil, sample size 5 ml; Clopton, J. R., and A. Roberts, JAOCS, 26:470-472 (1949); Clopton, Roberts, JAOCS, 30:156-158 (1949); David, L., 2017, Uses for Osage Orange Fruit, Gardenguides.com; Group, E., 2014, The health benefits of the Osage tree, Global Healing Center.com; Group, E., 2018, The health benefits of the Osage_tree, dreddymd.com; Hall, K., 2015, These little seeds have big medicinal properties, going2natural.com; Marieblogslife.com, 2017, *Pomifera* Oil—where it's found and benefits; Naturalmedicinalherbs.net, 2020, Herb: Osage Orange; Osage Orchards, 2020, Bois d'Arc Bioproducts and Agroforestry; Racehorseherbal.net, 2020, Osage orange tree; SalmaKarim, 2015, The benefits of Osage Orange, Fruit for Better Health; Hedgeapple.blogspot.com, 2012, Hedge apples as cure for Alzheimer's?).

Recently, our laboratory has employed Osage orange seed meals as an adhesive in fabrication of CWPs (Tisserat, B., J. Polym. Environ., 26 (9): 3957-3966 (2017); Tisserat, B., and R. Harry-O'kuru, Osage Orange, Honey Locust and Black Locust Seed Meal Adhesives Employed to Fabricate Composite Wood Panels, Fibers, vol. 7, no. 10 (2019)). However, in the continued course of our studies to find an industrial use for the non-seed portion of the fruit we surprisingly discovered that the fruit itself minus seeds could exhibit adhesive properties useful to fabricate CWPs. Surprisingly, the fruit adhesive properties could not be attributed to occurrence of proteins since the fruit portion contained very little protein (about 4-6%). Herein we describe procedures to employ ground OO fruit powder as a novel bio-adhesive.

SUMMARY OF THE INVENTION

Adhesive compositions containing (1) one or two adhesive compositions produced from the fruit but not the seeds of Osage orange fruit and (2) a known adhesive. The adhesive compositions produced from the fruit but not the seeds of Osage orange fruit are produced by a process involving drying the cut peel and mesocarp but not the seeds of the fruit of Osage orange to produce dried peel and mesocarp, milling the dried peel and mesocarp to produce milled peel and mesocarp, extracting the milled peel and mesocarp with an organic solvent (e.g., hexane) or a polar aprotic solvent (e.g., ethyl acetate) to produce the first adhesive composition, and optionally wherein the amorphous layer between the polar aprotic solvent and the milled peel and mesocarp is the second adhesive composition.

A method of bonding a first article to a second article involving (a) depositing on a surface of the first article the adhesive composition thereby creating a binding area; and (b) contacting the binding area with a surface of the second article; and (c) applying heat and pressure to bond the first article to the second article.

An adhesive product comprising the adhesive composition described herein.

A method of producing a composite material involving: (a) combining wood strands, particles, fibers, or veneers with the adhesive composition described herein to produce a mixture; and (b) curing the mixture produced by step (a) to produce the composite material.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Exemplary

Exemplary

DETAILED DESCRIPTION OF THE INVENTION

Figure 1:
FIG. 1 shows an example of OO fruit extraction in EtOAc as described herein. Note the center layer of amorphous particles.

Disclosed are adhesive compositions containing (1) one or two adhesive compositions produced from the fruit but not the seeds of Osage orange fruit and (2) a known adhesive. The one or two adhesive compositions produced from the fruit but not the seeds of Osage orange fruit are produced by a process involving drying the cut peel and mesocarp but not the seeds of the fruit of Osage orange to produce dried peel and mesocarp, milling the dried peel and mesocarp to produce milled peel and mesocarp, extracting the milled peel and mesocarp with an organic solvent (e.g., hexane) or a polar aprotic solvent (e.g., ethyl acetate) to produce the first adhesive composition, and optionally wherein the amorphous layer between the polar aprotic solvent and the milled peel and mesocarp is the second adhesive composition.

CWPs employed in our studies consisted of only ground OO fruit as the adhesive reinforced with wood chips. No additional additives were included in the formulations to affect the OO fruit adhesive. Overall, wood-adhesive bonding performance depends on the interaction of the fluid phase of the adhesive to the wood structure (Frihart et al., 2008). Wood of each species has its own characteristics that uniquely interacts with the adhesive contributing toward the final bonding strength of the CWP. *Paulownia elongata* L. wood (PW), family Paulowniaceae served as the wood reinforcement. *Paulownia* trees are deciduous, fast growing and coppice (Ates, S., et al., Afr. J. Biotech., 7 (22): 4153-4158 (2008)). PW characteristics differ from other hardwoods because it is relatively soft, light weight and has a low density. Previous studies have shown PW makes excellent CWPs (Tisserat, B., et al., 2016, Various extraction methods influence the adhesive properties of dried distiller's grains and solubles and press cakes of pennycress (*Thlaspi arvense* L.) and lesquerella (*Lesquerella fendleri* A. Gary (S. Watson) in fabrication of lignocellulosic composites; 2017; Tisserat and Harry-O'kuru, 2019). The OO fruit CWPs flexural, physical, surface roughness, color and dimensional stability properties determined. We compared the flexural and dimensional stability properties of OO Fruit CWPs with CWPs fabricated with soybean flour. Soybean flour is considered to be a potential commercial alternative to synthetic-based resins (Li et al., 2014; Frihart and Lorenz, 2014). A favorable comparison of OO fruit powder to soybean flour would further the interest in employing this bio-adhesive. The flexural and dimensional stability properties of our CWPs compared with the European Committee for Standards specifications for CWPs was conducted to determine if OO fruit CWPs have commercial applications.

The adhesive compositions may further contain water or plasticizer at about 10 to about 98% by weight (e.g., 10 to 98% by weight) of the entire composition. A plasticizer is an additive that improves a material's flexibility, workability, and/or durability. Plasticizers for proteins include glycerol, sorbitol, and polyethylene glycol.

The adhesive compositions described herein can be used in a variety of different applications, which include, for example, bonding together many different types of wood substrates and/or creating composite wood materials.

The adhesive compositions may be produced by processes involving drying the cut peel and mesocarp but not the seeds of the fruit of Osage orange to produce dried peel and mesocarp, milling the dried peel and mesocarp to produce milled peel and mesocarp, extracting the milled peel and mesocarp with an organic solvent (e.g., hexane) or a polar aprotic solvent (e.g., ethyl acetate) to produce the first adhesive composition, and optionally wherein the amorphous layer between the polar aprotic solvent and the milled peel and mesocarp is the second adhesive composition.

Also disclosed are methods of bonding a first article to a second article. The methods involve the steps of (a) depositing on a surface of the first article of any one of the disclosed adhesive compositions thereby creating a binding area; and (b) contacting the binding area with a surface of the second article to bond the first surface to the second surface. The method optionally also comprises the step of, after step (b), permitting the adhesive composition to cure, which can be facilitated by the application of pressure, heat or both pressure and heat.

The adhesive compositions can be applied to the surfaces of substrates in any conventional manner. Alternatively, the surfaces can be coated with the composition by spraying, brushing, doctor blading, wiping, dipping, pouring, ribbon coating, or combinations of these different methods, and the like.

In addition, there are disclosed methods of producing a composite wood material. The method involves the steps of (a) combining a first article(s) and a second article with any one of the foregoing adhesive compositions to produce a mixture; and (b) curing the mixture produced by step (a) to produce the composite material. The curing can comprise applying pressure, heat or both pressure and heat to the mixture.

In certain embodiments, the first article, the second article, or both the first and second articles are lignocellulosic materials, or composite materials containing lignocellulosic material (e.g., lumber by-products such as wood flour, wood scraps, sawdust, wood fibers, wood strands, or wood particulates, or vegetable fibers (lignin-containing materials such as hemp stalks, sugar cane residue, rye and wheat straw)). The first article, the second article, or both the first and second articles can comprise a metal, a resin, a ceramic, a polymer, a glass or a combination thereof. The first article, the second article, or both the first article and the second article can be a composite. In addition, provided are articles produced by each of the foregoing methods of manufacture.

In addition, there is provided articles comprising two or more components bonded together using one or more of the adhesive compositions described herein. The bonded components can be selected from the group consisting of paper, wood, glass, metal, fiberglass, wood fiber, ceramic, ceramic powder, plastic (for example, a thermoset plastic), and a combination thereof. In certain other embodiments, the bonded components can be selected from the group consisting of paper, wood, glass, metal, fiberglass, wood fiber, ceramic, ceramic powder, sand, plastic (for example, a thermoset plastic), and a combination thereof. Also provided are articles (for example, a composite material, laminate, or a laminate containing composite material) produced using one or more of the adhesive compositions described herein.

The composite material can be chip board, particle board, fiber board, plywood, laminated veneer lumber, glulam, laminated whole lumber, laminated composite lumber, composite wooden I-beams, medium density fiberboard, high density fiberboard, orientated strand board, extruded wood, or fiberglass. The composite can be a thermosetting composite or a thermoplastic composite.

In certain embodiments, the article is a composite, such as a random non-oriented homogeneous composite, an oriented composite, or a laminated composite.

In certain embodiments, the article comprises a lignocellulosic component. Furthermore, the article can comprise paper, wood, glass, fiberglass, wood fiber, ceramic, ceramic powder, or a combination thereof.

In certain embodiments, the article is a particle board composite. The amount of wood and adhesive composition used to prepare the particle board composite can be adjusted to optimize the performance properties of the particle board for different applications (e.g., outdoor use where increased water resistance is desirable). In certain embodiments, the composite comprises at least about 80% (w/w) wood, at least about 90% (w/w) wood, at least about 95% (w/w) wood, or at least about 98% (w/w) wood.

The adhesives described herein can be used in the production of a variety of wood-based products including composite materials, laminates, and laminates that contain composite materials. For example, the adhesives can be used in the production of consolidated wood composites, for example, chipboard (also known as OSB), fiberboard, and related composite wood products, as well as in the production of engineered lumber composites, for example, I-beams (I-joists), laminated veneer lumber (LVL), and other types of structural lumber composites.

The invention also provides a method of producing a composite material. The method comprises the steps of (a) combining a first article and a second article with any one of the foregoing adhesive compositions to produce a mixture; and (b) curing the mixture produced by step (a) to produce the composite material. The curing can comprise applying pressure, heat or both pressure and heat to the mixture.

The terms "substrate", "adhered" and "article" are interchangeable and refer to the substances being joined, bonded together, or adhered using the methods and compositions described herein. In certain embodiments, the first article, the second article or both the first and second articles are lignocellulosic materials, or composite materials containing lignocellulosic material. Furthermore, the first article, the second article or both the first and second articles can comprise a metal, a resin, a ceramic, a polymer, a glass or a combination thereof. It is understood that the first article, the second article, or both the first article and the second article can be a composite.

The adhesive compositions can be used to bond multiple lignocellulosic materials (adherends) together to prepare composite wood products. Furthermore, it is understood that at least one of the adherends bonded together and/or included in the composite can be wood, wood fiber, paper, rice hulls, fiberglass, ceramic, ceramic powder, plastic (for example, thermoset plastic), cement, stone, cloth, glass, metal, corn husks, bagasse, nut shells, polymeric foam films or sheets, polymeric foams, fibrous materials, or combinations thereof.

The amount of adhesive composition applied to the adhesive bond between substrates may vary considerably from one end use application, or type of adhesive used, or type of substrate, to the next. The amount of adhesive should be sufficient to achieve the desired bond strength and bond durability under a given set of test conditions.

The amount of an adhesive composition applied generally may be in the range of from about 10 to about 500 grams per square foot (e.g., 10 to 500 grams per square foot) of bond surface area (i.e., the bond surface area being the area of overlap between the substrates to be bonded by the adhesive composition). Below are actual amounts used to made CWPs:

Dealing with amount of adhesives used per sq. ft. and its cost.

| Adhesives (%) | Adhesives (g) | Width (in) | Length (in) | sq. in. (in²) | sq. ft. (ft²) | g/ft² (g/ft²) | OO fruit adhesive cost ($/g) | Soybean meal adhesive cost ($/g) |
|---|---|---|---|---|---|---|---|---|
| 10 | 16  | 5 | 11 | 55.00 | 0.381944 | 41.89091 | $0.0096 | $0.0415 |
| 15 | 24  | 5 | 11 | 55.00 | 0.381944 | 62.83636 | $0.0145 | $0.0622 |
| 25 | 40  | 5 | 11 | 55.00 | 0.381944 | 104.7273 | $0.0241 | $0.1037 |
| 50 | 80  | 5 | 11 | 55.00 | 0.381944 | 209.4545 | $0.0482 | $0.2074 |
| 75 | 120 | 5 | 11 | 55.00 | 0.381944 | 314.1818 | $0.0723 | $0.3110 |

Assume that 1 gram OO fruit costs $0.00023 (because 1 ton fruit costs $200.00);
Assume that 1 gram Soybean meal costs $0.000992 (because 1 lb. SBM costs $0.45).

The adhesive compositions can be used to fabricate multi-substrate composites or laminates, particularly those comprising lignocellulosic or cellulosic materials, such as wood or paper. The adhesives can be used to prepare products such as plywood, laminated veneer lumber (LVL), waferboard (also known as chipboard or OSB), particle board, fiberboard, fiberglass, composite wooden I-beams (I-joists), and the like.

The adhesive compositions can also be used to fabricate composite materials, which include, for example, chip board, particle board, fiber board, plywood, laminated veneer lumber, glulam, laminated whole lumber, laminated composite lumber, composite wooden I-beams, medium density fiberboard, high density fiberboard, extruded wood, or fiberglass.

Under certain circumstances, pressure and/or heat can be used to facilitate curing. The amount of pressure and the time period for which the pressure is applied are not limited and specific pressures and times will be evident to one skilled in the art from the present disclosure (see the various Examples). In certain embodiments, a pressure of about 0.4 MPa to about 14 MPa (e.g., 0.4 MPa to 14 MPa) is applied from about 2 minutes to about 2 hours (e.g., 2 minutes to 2 hours), preferably from about 10 minutes to about 2 hours (e.g., 10 minutes to 2 hours), preferably from about 2 minutes to about 30 minutes (e.g., 2 minutes to 30 minutes), or more preferably from about 5 minutes to about 30 minutes (e.g., 5 minutes to 30 minutes) (depending on the temperature). The pressure, heating, or application of both pressure and heat may promote curing and also decrease the viscosity adhesive compositions described herein, facilitating their flow in the contact area, such that a bonding region is created whereby there is a continuum between the adherends. The amount of pressure, heat time or their combination can be optimized to ensure such continuum and will depend on the adherends' physical or chemical properties as well as on the rate of the adhesive's viscosity-build throughout the cure cycle.

In addition, article (CWPs) can be fabricated comprising two or more components bounded together using one or more of the adhesive compositions described herein. The bonded components can be selected from the group consisting of fruit adhesive, soybean flour (e.g., Prolia™, PRO), wood fibers. Certain embodiments of this are shown in the Tables 6 and 7.

In certain embodiments, the article (CWPs) can be chip boards, particle boards, hardboards, fiber boards, plywood, laminated veneer lumber, composite wooden I-beams, orientated strand boards, extruded wood or fiberglass.

In certain embodiments, the article composes a lignocellulosic component, comprising of paper, wood, fiberglass, ceramic powder, or a combination thereof.

Other compounds (e.g., adhesives known in the art) may be added to the composition provided they do not substantially interfere with the intended activity and efficacy of the composition; whether or not a compound interferes with activity and/or efficacy can be determined, for example, by the procedures utilized below.

"Optional" or "optionally" means that the subsequently described event or circumstance may or may not occur, and that the description includes instances in which said event or circumstance occurs and instances where it does not. For example, the phrase "optionally comprising a known adhesive" means that the composition may or may not contain a known adhesive and that this description includes compositions that contain and do not contain a known adhesive. Also, by example, the phrase "optionally adding a known adhesive" means that the method may or may not involve adding a known adhesive and that this description includes methods that involve and do not involve adding a known adhesive.

By the term "effective amount" of a composition or property as provided herein is meant such amount as is capable of performing the function of the composition or property for which an effective amount is expressed. As will be pointed out below, the exact amount required will vary from process to process, depending on recognized variables such as the compositions employed and the processing conditions observed. Thus, it is not possible to specify an exact "effective amount." However, an appropriate effective amount may be determined by one of ordinary skill in the art using only routine experimentation.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments and characteristics described herein and/or incorporated herein. In addition, the invention encompasses any possible combination that also specifically excludes any one or some of the various embodiments and characteristics described herein and/or incorporated herein.

The amounts, percentages and ranges disclosed herein are not meant to be limiting, and increments between the recited amounts, percentages and ranges are specifically envisioned as part of the invention. All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10 including all integer values and decimal values; that is, all subranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions (e.g., reaction time, temperature), percentages and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much as 10% to a reference quantity, level, value, or amount. For example, about 1.0 g means 0.9 g to 1.1 g and all values within that range, whether specifically stated or not.

Unless defined otherwise, all technical and scientific terms used herein have the same meaning as commonly understood by one of ordinary skill in the art to which the invention belongs. The definitions herein described may or may not be used in capitalized as well as singular or plural form herein and are intended to be used as a guide for one of ordinary skill in the art to make and use the invention and are not intended to limit the scope of the claimed invention. Mention of trade names or commercial products herein is solely for the purpose of providing specific information or examples and does not imply recommendation or endorsement of such products. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

Examples

Materials and preparations: Fruits of OO were collected from trees grown in the city of Pekin, Tazewell County, Illinois. Fruits were examined for blemishes and unsuitable fruits were discarded. Further examination by twisting the fruit by hand causes decaying fruits to split open revealing the internal decay. These fruits were also discarded. Acceptable fruits were stored in refrigerators or freezers prior to processing. This was done to prevent fruit deterioration and aided in the fruit firmness to allow for easier slicing. Using a meat cutter (KWS MS-10XT Premium 320 W electric meat slicers 10-inch blade, Kitchenware Station, Santa Fe Springs, CA) the peel portion (peel and mesocarp) (OOP) of pre-cooled or pre-frozen fruits were carefully excised as 2-mm thick slices from the internal core portion (seeds, mesocarp and pith) (OOC); it is much easier to slice the fruit when frozen (about 0° to about −20° C.) or pre-cooled in a refrigerator (about 36-38° F./about 2.2-3.3° C.) because the sticky mucous that is emitted by the fruit. Cutting was discontinued when seeds appeared in the slices. Approximately 80-85% of the fruit contains water. OOP and OOC were dried using either a convection oven drying (OD; at about 60° C.) or a freeze-drying (FD). Dried fruit portions (OOODP (oven dried OOP), OOODC (oven dried OOC), OOFDP (freeze dried OOP), or OOFDC (freeze dried OOC)) were then milled with a Thomas-Wiley mill grinder (Model 4, Thomas Scientific, Swedesboro, NJ) using a 3 mm screen mesh. OOODP, OOODC, OOFDP and OOFDC portions were subjected to Soxhlet extractor with an organic solvent (e.g., hexane) (Table 1) to produce OOODP/HEX, OOODC/HEX, OOFDP/HEX, and OOFDC/HEX, respectively. In addition, OOODP, OOODC, OOFDP, and OOFDC portions were subjected to polar aprotic solvent (e.g., ethyl acetate) extraction (EtOAc) by stirring for OO Fruit powders for 8 hrs. to produce OOODP/EtOAc, OOODC/EtOAc, OOFDP/EtOAc, and OOFDC/EtOAc, respectively. During this process, an amorphous layer occurred between the EtOAC solvent and the fruit material. This amorphous layer (AL) was collected separately and is referred to as the OOAL fruit fraction. Fruit materials were further ground in a coffee grinder and sieved through a #40 screen to produce ≥420 μm particles.

*Paulownia* trunks measuring 95 cm L×15 cm diam were obtained from trees grown in Fort Valley, GA. Trunks were split with an electrical wood splitter (Southland 6-ton 15 Amp Electric log splitter, Southland Outdoor Power Equipment, Long Grove, IL). Split logs were then sawn into 15 cm lengths with a 10-inch compound Miter Saw (Model C10CGS Compound Miter Saw, Metabo HPT, Braselton, GA). Cut lengths were ground into chips with an Electric woodchipper (Model CSV-2515 1.5 HP, Patriot Products, Inc., Pewaukee, WI). Chips were milled using 2- and 1-mm screens in a Wiley mill (Model 4, Thomas Scientific, Swedesboro, NJ). Final fraction particles were separated with a shaker (Model RX-29, Tyler, Mentor, OH) thru #10, #12 and #30 meshes (Newark Wire Cloth Company, Clifton, NJ). Wood fractions collected from the #12 and #30 meshes were of (1) greater than 600 to 1700 μm diameter and (2) less than or equal to 600 μm diameter, respectively. PW was dried prior to testing (moisture content about 5-8%).

Preparation of composite panels: Composite panels consisted of 15, 25 or 50% adhesive matrix (See Table 1) and mixed with reinforcement PW of equal proportions of (1) greater than 600 to 1700 μm and (2) less than 600 μm particles (Table 1). Panels consisted of adhesive matrix and wood fillers added to a self-locking plastic bag and mixed together via circular agitation for 15 min in a compact dryer (Model MCSDRYIS, Magic Chef, Chicago, IL). Ingredients were layered in an aluminum mold (15.2 cm W×30.5 cm L×5 cm DO.D.; 12.7 cm W×28 cm L×5 cm D I.D.). Molds were pressed a manual hydrolytic press to 185° C. for a total of 12 minutes (Tisserat, B., et al., Bioresources, 13 (2): 2678-2710 (2019).

Analysis of adhesive matrix ingredients: Protein content of original and solvent treated fruit matrices was determined via combustion using a Protein/Nitrogen Determinator (LEC FP-528 Model 601-500, St. Joseph, MI). Moisture content of the untreated and solvent treated meals was obtained with a Halogen Moisture balance/analyzer (Model HG63, Mettler-Toledo International Inc., Columbus, OH).

Composite panel evaluation: WCPs were cut into specimen boards with a table saw and tested according to EN 310:1993 procedures. Panels had dimensions of 50 mm W×127 mm L×about 3.5-5.5 mm thickness. Modulus of rupture (MOR) and modulus of elasticity (MOE) tests were conducted on samples employing an Instron testing machine (Model 1122, Instron Corp., Norwood, MA) using a crosshead speed of 5 mm/min. For each composite formulation, five specimen boards were tested, and their average and standard errors reported. The experimental data obtained were analyzed statistically by analysis of variance for statistical significance and multiple comparisons of means using Duncan's Multiple Test (p≤0.05). Water absorption (WA) and thickness swelling (TS) were measured according to EN 317:1993 procedures. Test samples were cut into 50 mm$^2$ dimensions and immersed in distilled water for 24 hrs. Thickness and weight of samples were measured before and immediately after soaking.

Figure 2:
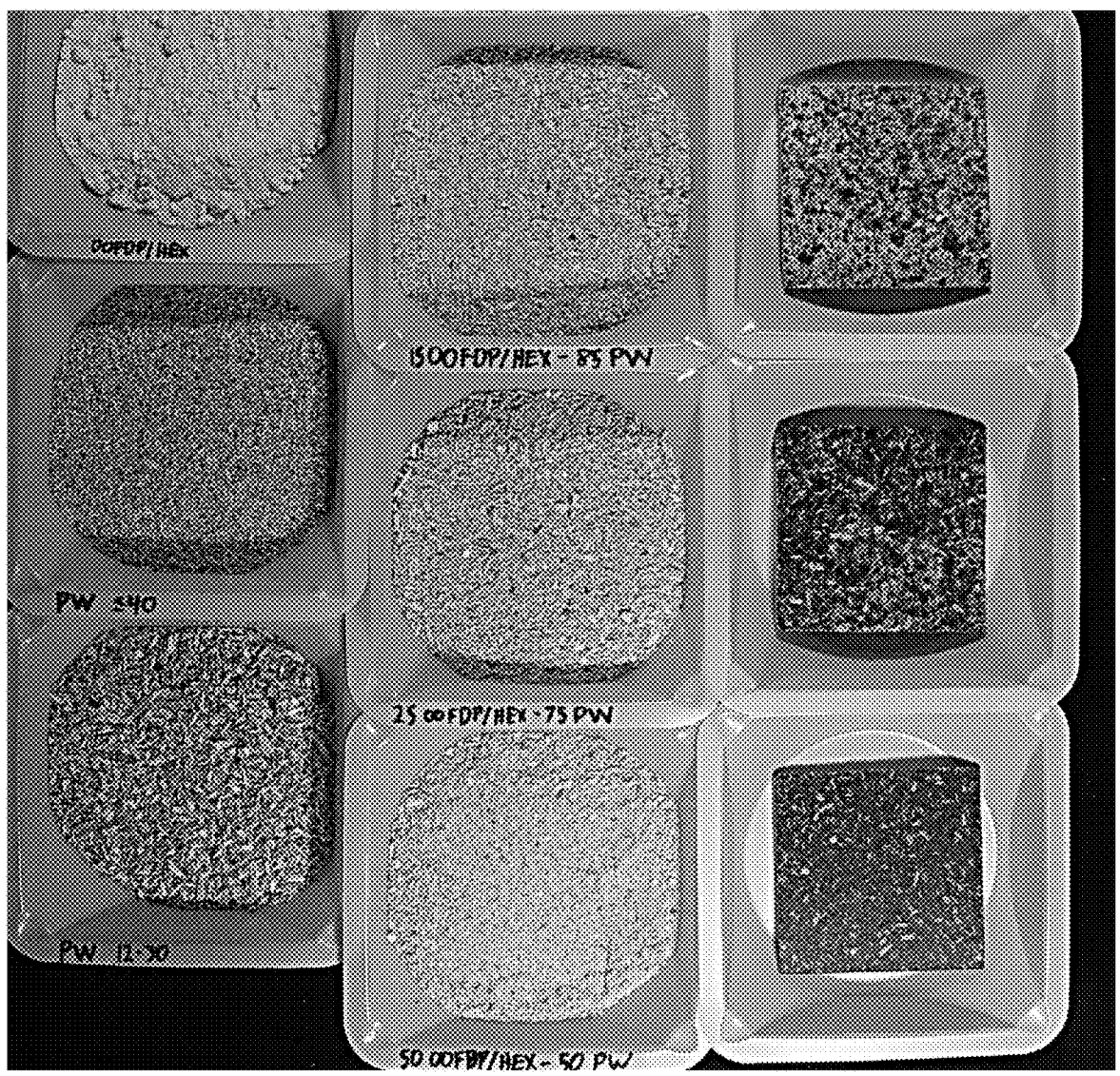
FIG. 2 shows ingredients and mixtures and fabricated CWPs as described below. From left to right: First column, ingredients top to bottom: OOFDP/HEX powder, PW (≤600 μm particles), PW (600-1700 μm particles); Second column, Mixtures top to bottom: 15OOFDP/HEX-75 PW, 25OOFDP/HEX-50 PW, 15OOFDP/HEX-85 PW; Third column, Panels top to bottom: 15OOFDP/HEX-75 PW, 25OOFDP/HEX-50 PW, 15OOFDP/HEX-85 PW. Scale bar=30 mm.

Results and Discussion. Matrix and PW Dosages on the CWP Physical, Flexural and Dimensional Stability Properties: Table 2 provides the physical, flexural and dimensional data obtained from OO fruit CWPs. The dosage of OO fruit powder employed had significant effect on the physical, flexural and dimensional stability properties of the CWPs (FIG. 2). Flexural properties of CWPs are a measurement of the strength of the product. The higher the MOR and MOE values the greater its durability to application. Generally, CWPs employing the 25% OO fruit powder derived from the peel (e.g., 25OOFDP-75 PW, 25OOODP-75 PW) was best to obtain the highest flexural properties (MOR and MOE); while the highest dimensional stability properties (WA and TS) were obtained with the CWPs employing 50% fruit powder (50OOFDP-50 PW, 50OOODP-50 PW). Likewise, the densities of CWPs employing 50% fruit powder were greater than CWPs employing 25% fruit powders. We can attribute this to increased dimensional stability of CWPs to higher densities and correspondingly to lower panel thickness. CWPs with higher densities invariably are less susceptible to water damage because they have less space for water to penetrate. However, higher densities in this study did not cause the CWPs to exhibit greater flexural properties which is surprising. OOFDP CWPs utilizing solvent treated OOFDPs or OOODPs exhibited higher flexural properties than the CWP utilizing the original OOFDP or OOODP powder. CWPs utilizing OOFDP exhibited higher flexural properties than CWPs utilizing OOODP. Without being bound by theory, this could be attributed to the lightweight nature of OOFDP verses OOODP which allowed for more powder volume to interact with the PW for a weight basis (the lighter the powder the more powder/g can be added to the panel). The composition of the CWPs is mainly carbohydrates, which have been found to be provide poor water resistance (Frihart, C. R., and M. J. Birkland, Chapter 8: Soy properties and soy wood adhesives, Dec. 23, 2014 IN: Soy-Based Chemicals and Materials, Brentin, ACS Symposium Series; American Chemical Society, Washington, DC, Chapter 8, pp. 167-192 (2014)). Our fruit powder adhesives contain very little protein. Soybean meal, commonly used as a bio-adhesive, contains ~50% protein; our OO fruit powders contain ~4-6% protein. Therefore, it is probably not surprising that these OO fruit CWPs exhibit relatively poor dimensional stability properties. However, they surprisingly express promising adhesive properties (Table 2).

CWPs utilizing the core portion of the fruit exhibited lower flexural properties than CWPs utilizing the peel portion (Table 2). Nevertheless, OOFDC and OOODC CWPs surprisingly exhibited considerable strength properties (Table 2). CWPs utilizing the OOFDC and OOODC contained seeds which caused them to have higher protein contents (10-12%) compared to OOFDP and OOODP CWPs (4-6%). OO seeds contain ~35% protein. It would seem probable that these OOFDC and OOODC CWPs would exhibit higher flexural properties than OOFDP and OOODP CWPs, but surprisingly this wasn't the case. Without being bound by theory, this observation again suggests that the adhesive properties of OO fruits is a carbohydrate component since oils and proteins are present in small or negligent amounts. Overall, the OOFDC and OOODC CWPs exhibited the same dosage and solvent responses as the OOFDP and OOODP.

The amorphous layer (OOAL) recovered from the EtOAc solvent extraction of fruit peel was surprisingly found to exhibit the greatest flexural properties of all the fruit portions at the 15% and 25% dosages tested in this study (Table 2). Currently we do not understand how the adhesive properties of OO fruit operate. This should not be surprising since we understand very little of how any bio-adhesives bind to wood (Frihart, 2009; Frihart, C. R., 2016a, Cohesion and adhesion with proteins. 39th Annual Meeting of the Adhesion Society, Feb. 21-24, 2016, The Westin Riverwalk Hotel, San Antonio, Texas, 4p; Frihart, C. R., 2016b, Adhesive penetration of wood and its effect on bond strength, 39th Annual Meeting of the Adhesion Society, Feb. 21-24, 2016, The Westin Riverwalk Hotel, San Antonio, Texas; Frihart, C. R., 2016c, Potential for biobased adhesives in wood bonding, Proceedings of the 59th International Convention of Society of Wood Science and Technology; Frihart and Birkland, 2014; Frihart and Holly, 2013; Frihart, C. R., et al., 2008a, Enhancing bondline performance: proceedings of the Final Conference in COST E34, Bonding of Timber, Sopron, Hungary, 6th-7 May 2008, University of West Hungary, Faculty of Wood Sciences, Institute of Product Design and Technology, p. 89-101 (2008); Frihart, C. R., et al., 2008b, What does moisture-related durability of wood bonds mean? Enhancing bondline performance, proceedings of the Final Conference in COST E34, Bonding of Timber, Sopron, Hungary, 6-7 May 2008, University of West Hungary, Faculty of Wood Sciences, Institute of Product Design and Technology, p. 89-101 (2008); Frihart, C. R, Wood adhesion and adhesives, Handbook of wood chemistry and wood composites, Boca Raton, FL, CRC Press, pages 215-278 (2005); Frihart, C. R., J. Adhes. Sci. Technol., 23 (4), 601-617 (2009); Frihart, C. R. (2011a), "Influence of soy type on wood bonding performance," IN: Proceedings of the 34th annual meeting of the Adhesion Society, 13-16 Feb. 2011, Savannah, GA, p. 3; Frihart, C. R., Forest Products J., 61 (1), 4-12 (2011b); Frihart, C. R. (2016a), "Cohesion and adhesion with proteins," IN: 39th Annual Meeting of the Adhesion Society, 21-24 Feb. 2016, The Westin Riverwalk Hotel, San Antonio, Texas; p. 4; Frihart, C. R. (2016b). "Adhesive penetration of wood and its effect on bond strength," IN: 39th Annual Meeting of the Adhesion Society, 21-24 Feb. 2016, The Westin Riverwalk Hotel, San Antonio, Texas; p 4; Frihart, C. R. (2016c), "Potential for biobased adhesives in wood bonding," IN: Proceedings of the 59th International Convention of Society of Wood Science and Technology, 6-10 Mar. 2016, Curitiba, Brazil, pp. 68-75; Frihart, C. R., and Birkland, M. J. (2014), "Chapter 8: Soy properties and soy wood adhesives In Soy-Based Chemicals and Materials," IN: ACS Symposium Series; American Chemical Society, 23 Dec. 2014, Washington, D.C., pp. 167-192; Frihart, C. R., and S. Holly, J. Adhes. Sci. Technol., 27 (18-19): 2043-2052 (2013); Frihart, C. R., et al., Ovalbumin as a Wood Adhesive. IN: The Adhesion Society's 37th Annual Meeting, 23-26 Feb. 2014, Bahia Resort Hotel, San Diego, CA., p. 3; Frihart, C. R., and L. Lorenz, Forest Prod. J., 63 (3/4): 138-142 (2013);

Frihart, C. R., and L. F. Lorenz, L. F. (2018), Protein adhesives, IN: Pizzi, A., and K. L. Mittal, eds., Handbook of adhesive technology, third edition, Boca Raton, FL: CRC Press: 145-175. Chapter 5; Frihart, C. R., et al., (2008), "What Does Moisture-Related Durability of Wood Bonds Mean?," IN: Enhancing bondline performance: proceedings of the Final Conference in COST E34, Bonding of Timber, 6-7 May 2008, Sopron, Hungary, p. 89-101; Hofferber, B. M., et al., Effects of swelling forces on the durability of wood adhesive bonds, Proceedings of the 29th annual meeting of the Adhesion Society, Inc., Feb. 19-22, 2006, Jacksonville, FL, pages 187-189 (2006); Hunt, C. G., et al., Heat resistant soy adhesives for structural wood products, Proceedings, 32nd annual meeting of the Adhesion Society, Inc., Feb. 15-18, 2009, Savannah, GA, Adhesion Society, c2009: p. 74-76 (2009)). Nevertheless, the ability of OO fruit to express adhesive properties is surprisingly novel. Few if any studies have considered using fruits as adhesives. To date, bio-adhesives have centered on employment of seed meal adhesives which contain high concentrations of proteins (Frihart, 2009, 2011a, 2011b; Gao et al., 2012a; Gao, Q., et al., J. Appl. Polym. Sci., 125:3676-3681 (2012b); Hojilla-Evangelista, M. P., JAOCS, 79 (11): 1145-1149 (2002); Li, C., et al., Bioresources, 9 (3): 5448-5460 (2014); Nur Farahain, K., 2013, Jatropha oil based bio-adhesive for plywood application, Master's thesis, University Malaysia Pahang; Ong et al., 2011; Wescott, J., and C. Frihart, Chem. Ind., Feb. 7, 2011, pages 21-23; Wrede, 2016; Xi, U., et al., Adv. Mat. Res., 343-344 (2012), 875-881).

Table 3 compares the properties of OO Fruit CWPs with the nominal properties of commercial CWPs fabricated with synthetic adhesives and CWPs fabricated with soybean flour. OO Fruit CWPs were surprisingly found to exhibit similar flexural properties as commercial and soybean four CWPs.

CWP Color Analysis: CWP color properties are presented in Table 4. The lightness (L*), green-red coordinates (a*) and blue-yellow coordinates (b*), and chromaticity (color saturation) of the CWPs were influenced by the concentration of the matrix and wood reinforcement components (FIG. 2; Table 4). Increasing the concentration of the bio-based adhesives darkens the CWP with significant decreases in lightness, redness, yellowness, and chromatic values (Table 4). The H* values were less affected by matrix concentration. For example, 15OOFDP-85 PW and 50OOFDP-50 PW composites exhibited L*, a*, b*, and C*ab values of: 59, 4, 18, and 18; and 24, 3, 4, and 5, respectively.

The original ingredients and mixture of ingredients had color properties that were considerably different from the molded CWPs (FIG. 2). This can be attributed to the heating and pressure employed to generate the molded panels. Other investigators reported that heat treated wood similarly exhibited color alterations which resulted in decreases in L*, a*, b*, and C*ab values (Zanuncio, A. J. V., et al., Maderas-Cienc. Technol., 17 (4): 856-864 (2015)). Heating causes the destruction or alteration of extractives within wood which causes color changes (Zanuncio et al. 2015). Matrices concentrations contributed to color changes of the molded bio-composite panels because they were undoubtedly influenced by the molding conditions.

CWP Surface Roughness Analysis: Table 5 provides the surface roughness properties for OO CWPs. Generally, CWPs containing high concentrations of PW (e.g., 15OOFDP, 15OOFDP/HEX, 15OOFDP/EtOAC) and lower concentrations of wood invariably exhibited high surface roughness values. Conversely, the inclusion of higher matrix concentrations (i.e., 25% or 50%) resulted in lower surface roughness values. Surface roughness represents a reliable non-destructive method to quantify important surface properties (i.e., appearance, feel, interaction to additives or over-layments) (Rolleri, A., and E. Roffael, Maderas-Cienc. Tech., 12 (2): 143-148 (2010)). Surface roughness is caused by fine irregularities occurring on the surface. $R_a$ measurements provide the most important property for surface roughness analysis (Rolleri and Roffael 2010). It is interesting to note that CWP utilizing 00 fruit powders were surprisingly smoother in terms of $R_a$ values than CWPs utilizing commercial synthetic resins (Rolleri and Roffael 2010; Ayrilmis, N., et al., Compos. Part B-Eng., 43 (2): 325-331 (2012)). We may attribute this to the binding nature of the OO fruit bio-adhesive and the PW reinforcement (Ulker, O., Materials, 11 (3): 407 (2018)). Surface roughness values provides a test to determine how bio-based panels will react in moisture (i.e., wet, humid, or immersed water conditions) (Ulker 2018). Wood panels with a high frequency of surface irregularities resulting in high surface roughness properties (e.g., $R_a$, $R_z$, and $R_y$) correspondingly exhibit poorer dimensional stability properties (Hiziroglu, S., J. Comp. Mat., 41 (4): 467-476 (2007); Ulker 2018)). As shown in Tables 2 and 5, CWPs containing the low percentages of bio-adhesives exhibited higher surface roughness properties and conversely lower flexural properties and dimensional stability properties.

Tables 6 and 7 demonstrate that OO Fruit adhesives can be mixed with other adhesive ingredients (e.g., Prolia™ (PRO), soybean flour) to fabricate a mixed adhesive CWPs that exhibits relatively high flexural properties. These results demonstrate that OO Fruit CWPs can be fabricated with non-fruit adhesive components. Surprisingly, mixing 50% PRO flour with 50% OOFDP/Hex powder provides CWPs that have flexural properties as good as CWPs composed of 100% PRO flour. Similarly, when the 50% OOFDC/HEX-PRO CWPs were fabricated with 50% PRO and 50% OOFDC flexural properties were surprisingly maintained compared to using 100% of the original ingredients. This could result in a lowering of the cost of the soybean CWPs. When 15% OOFDC/HEX-PRO or 15% OOFDP/HEX-PRO CWPs were fabricated with 50% PRO and 50% OOFDC flexural properties lessened compared to using 100% of the original ingredients. However, even these CWPs had flexural properties that were still similar to commercial CWPs (Table 3).

Conclusions: (1) Osage orange (OO) fruits were surprisingly found to have adhesive properties and could bind wood of *Paulownia* to fabricate Composite wood panels (CWPs). (2) Adhesive OO fruit powder was obtained by either drying the outer fruit OO peel (OOP) or inner fruit OO core (OOC) with a freeze dryer (FD) or oven dryer (OD) followed by grinding. Distinct fruit adhesives were generated: OOFDP, OOODP, OOFDC, and OOODC. (3) CWPs were generated using 15, 25 or 50% OOFDP, OOODP, OOFDC or OOODC as the adhesive powders and hot pressed into composite panels. (4) Flexural properties of these CWPs were surprisingly comparable to CWPs employing soybean meal (SBM) which is the industry standard. (5) CWPs utilizing fruit powders exhibited relatively poor dimensional stability properties compared to commercial CWPs or CWP derived from SBM. Without being bound by theory, this is probably due to the nature of the fruit adhesive which is composed of carbohydrates verses seed meal adhesives which are composed of proteins. (6) Dosage levels, solvent treatments, and fruit location from which the OO fruit powders were derived surprisingly have profound effects on the effectiveness of the OO fruit powder adhesive activity. (7) Color and surface roughness properties were closely associated with the dosage levels employed in the CWPs. (8) OO fruit powder can be mixed with other bio-based adhesives (e.g., soybean flour) to fabricate CWPs that had flexural properties that were similar to soybean CWPs. (9) These results surprisingly demonstrated that fruit powders have adhesive properties that may be employed in the manufacture of CWPs that are formaldehyde-free. Development of a commercial adhesive/resin product from OO non-seed fruit portions could promote these trees to become an important industrial crop.

All of the references cited herein, including U.S. Patents and U.S. Patent Application Publications, are incorporated by reference in their entirety. Also incorporated by reference in their entirety are the following references: Adhesives.org, 2016, Water-based adhesives; Burton, J. D., Osage-Orange, USDA-FS, FS-248, January 1973, pg. 1-7; Businesswire.com, 2016, Demand for cost-effective and environmentally friendly wood products to drive the global engineered wood products market through 2020, says Technavio; Dumé, 2019, 'Glue' in English ivy contains glycoprotein nanoparticles, nanotechweb.org; Eghtedarnejad, N., and H. R. Mansouri, Eur. J. Wood Prod., 76:1753-1756 (2018); El-Showk, S., and N. El-Showk, 2003, The *Paulownia* tree—an alternative for sustainable forestry, cropdevelopment.org; European Committee for Standardization, Brussels, 1993a, EN 310:1993, Wood-based panels-determination of modulus of elasticity in bending and of bending strength; European Committee for Standardization, Brussels, 1993b, EN 317: 1993, Particleboards and fibreboards—determination of swelling in thickness after immersion in water; European Committee for Standardization, Brussels, 1993c, EN 323: 1993, Wood-based panels—determination of density; European Committee for Standardization, Brussels, 1997, EN 622-2:1997, Fibreboards—specifications—Part 2: requirements for hardboards; European Committee for Standardization, Brussels, 2003, EN 312:2003, Particleboard—specifications; European Committee for Standardization, Brussels, 2006, EN 622-5:2006, Fibreboards—specifications—Part 5: requirements for dry process boards (MDF); Huei, R. O., et al., Journal of Applied Sciences, 12:1148-1153 (2012); Invasive.org, 2016, Illinois Invasive Plant List; Kalaycioglu, H., et al., J. Wood Sci., 51:410-414 (2005); Khanjanzadeh, H., et al., Afr. J. Biotechnol., 11 (31): 8045-8050 (2012); Kurtz, C., Experts talk about engineered wood, May 12, 2010, networx.com; Moon, L., Hedge balls: Iowa's newest cash crop, Iowa Public Radio, Dec. 9, 2015; Moon, L., and C. Nebbe, Iowa chemist turns nuisance fruit into spendy cosmetic oil, Iowa Public Radio, Nov. 4, 2015; Pervaiz, M., and M. Sain, Bioresources, 6 (2): 961-970 (2011); Rafighi, A., and T. Tabarsa, Key Engineer. Mat., 471-472:1901-1094 (2011); Tisserat, B., J. Polym. Environ., 26:3957-3966 (2018); Tisserat, B., et al., Bioresources, 8 (1): 59-75 (2013); U.S. Pat. No. 10,023,777; U.S. patent application Ser. No. 15/651,149 filed on 17 Jul. 2017.

An adhesive composition, said adhesive composition comprising (or consisting essentially of or consisting of) (1) one or two adhesive compositions produced from the fruit but not the seeds of Osage orange fruit and (2) a known adhesive.

The above adhesive composition, wherein said one or two adhesive compositions produced from the fruit but not the seeds of Osage orange fruit are produced by a process comprising (or consisting essentially of or consisting of) drying the cut peel and mesocarp but not the seeds of the fruit of Osage orange to produce dried peel and mesocarp, milling said dried peel and mesocarp to produce milled peel and mesocarp, extracting said milled peel and mesocarp with an organic solvent or a polar aprotic solvent to produce said first adhesive composition, and optionally wherein the amorphous layer between said polar aprotic solvent and said milled peel and mesocarp is said second adhesive composition. The above adhesive composition, wherein said organic solvent is hexane. The above adhesive composition, wherein said polar aprotic solvent is ethyl acetate.

A process for producing a first adhesive composition and optionally a second adhesive composition from the fruit but not the seeds of Osage orange fruit, said process comprising (or consisting essentially of or consisting of) drying the cut peel and mesocarp but not the seeds of the fruit of Osage orange to produce dried peel and mesocarp, milling said dried peel and mesocarp to produce milled peel and mesocarp, extracting said milled peel and mesocarp with an organic solvent or a polar aprotic solvent to produce said first adhesive composition, and optionally wherein the amorphous layer between said polar aprotic solvent and said milled peel and mesocarp is said second adhesive composition.

A method of bonding a first article to a second article, said method comprising (or consisting essentially of or consisting of) (a) depositing on a surface of said first article the above adhesive composition thereby creating a binding area; and (b) contacting said binding area with a surface of said second article; and (c) applying heat and pressure to bond said first article to said second article.

An adhesive product comprising (or consisting essentially of or consisting of) the above adhesive composition.

A method of producing a composite material comprising (or consisting essentially of or consisting of): (a) combining wood strands, particles, fibers, or veneers with the above adhesive composition to produce a mixture; and (b) curing the mixture produced by step (a) to produce the composite material.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein).

The invention illustratively disclosed herein suitably may be practiced in the absence of any element (e.g., method (or process) steps or composition components) which is not specifically disclosed herein. Thus, the specification includes disclosure by silence ("Negative Limitations In Patent Claims," AIPLA Quarterly Journal, Tom Brody, 41 (1): 46-47 (2013): " . . . . Written support for a negative limitation may also be argued through the absence of the excluded element in the specification, known as disclosure by silence. . . . Silence in the specification may be used to establish written description support for a negative limitation. As an example, in Ex parte Lin [No. 2009-0486, at 2, 6 (B.P.A.I. May 7, 2009)] the negative limitation was added by amendment. . . . In other words, the inventor argued an example that passively complied with the requirements of the negative limitation . . . was sufficient to provide support. . . . This case shows that written description support for a negative limitation can be found by one or more disclosures of an embodiment that obeys what is required by the negative limitation. . . . "

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

CWP Formulation Weight Percentages

| Composition (Matrix-Reinforcement) | Matrix (%) | PW (%) |
|---|---|---|
| OOFDP, OOFDP/HEX, OOFDP/EtOAc-PW | 15, 25, 50 | 85, 75, 50 |
| OOFDC, OOFDC/HEX, OOFDC/EtOAc-PW | 15, 25, 50 | 85, 75, 50 |
| OOODP, OOODP/HEX, OOODP/EtOAc-PW | 15, 25, 50 | 85, 75, 50 |
| OOODC, OOODC/HEX, OOODC/EtOAc-PW | 15, 25, 50 | 85, 75, 50 |
| OOAL-PW | 15, 25, 50 | 85, 75, 50 |

TABLE 2

OO Fruit CWPs Physical, Flexural and Dimensional Stability Properties[1]. Means and standard errors are presented.

| Code | Thickness (mm) | Density (Kg·m$^{-3}$) | MOR (MPa) | MOE (MPa) | WA (%) | TS (%) |
|---|---|---|---|---|---|---|
| 15OOFDP-85PW | 3.9 ± 0.05 | 1101 ± 29 | 19.8 ± 1.91 | 4045 ± 431 | 205 ± 20 | 153 ± 4 |
| 25OOFDP-75PW | 3.5 ± 0.04 | 1249 ± 27 | 33.3 ± 1.12 | 5716 ± 471 | 158 ± 11 | 149 ± 5 |
| 50OOFDP-50PW | 2.4 ± 0.09 | 1397 ± 13 | 16.5 ± 1.54 | 2261 ± 166 | 44 ± 3 | 58 ± 5 |
| 15OOFDP/HEX-85PW | 4.0 ± 0.1 | 1105 ± 22 | 23.7 ± 1.69 | 4773 ± 360 | 237 ± 9 | 183 ± 1 |
| 25OOFDP/HEX-75PW | 3.5 ± 0.05 | 1268 ± 29 | 35.9 ± 0.88 | 6476 ± 281 | 117 ± 18 | 128 ± 9 |
| 50OOFDP/HEX-50PW | 2.6 ± 0.13 | 1377 ± 18 | 30.7 ± 2.48 | 4436 ± 365 | 67 ± 13 | 73 ± 9 |
| 15OOFDP/EtOAc-85PW | 3.9 ± 0.05 | 1121 ± 34 | 25.5 ± 2.43 | 4774 ± 433 | 183 ± 9 | 145 ± 5 |
| 25OOFDP/EtOAc-75PW | 3.4 ± 0.06 | 1271 ± 17 | 38.8 ± 1.30 | 6540 ± 267 | 115 ± 10 | 122 ± 6 |
| 50OOFDP/EtOAc-50PW | 2.8 ± 0.04 | 1397 ± 23 | 29.3 ± 1.48 | 4989 ± 283 | 49 ± 5 | 57 ± 4 |
| 15OOODP-85PW | 4.2 ± 0.04 | 1037 ± 22 | 11.4 ± 1.36 | 3218 ± 346 | 250 ± 8 | 176 ± 4 |
| 25OOODP-75PW | 3.6 ± 0.04 | 1204 ± 32 | 25.2 ± 2.23 | 5523 ± 510 | 152 ± 13 | 137 ± 4 |
| 50OOODP-50PW | 3.2 ± 0.08 | 1344 ± 24 | 22.4 ± 0.44 | 3438 ± 207 | 68 ± 8 | 75 ± 8 |
| 15OOODP/HEX-85PW | 4.1 ± 0.06 | 1062 ± 23 | 16.1 ± 0.68 | 4015 ± 328 | 235 ± 11 | 178 ± 9 |
| 25OOODP/HEX-75PW | 3.7 ± 0.06 | 1206 ± 31 | 29.8 ± 2.44 | 5935 ± 540 | 167 ± 10 | 151 ± 8 |
| 50OOODP/HEX-50PW | 3.3 ± 0.06 | 1342 ± 23 | 28.5 ± 0.52 | 4465 ± 61 | 92 ± 12 | 92 ± 7 |

[1]abbreviations:
MOR = modulus of rupture;
MOE = modulus of elasticity;
WA = water absorption;
TS = Thickness swelling.

TABLE 3

European Committee for Standardization nominal properties for various CWPs employed in interior dry and humid conditions compared to tree seed meal CWPs. Note PB, MDF and HB density values represent values reported in the literature and none are authorized by standards[1].

| Description (Panel type, thickness) | Density* (Kg·m$^{-3}$) | MOR** (MPa) | MOE** (MPa) | TS** (mm) |
|---|---|---|---|---|
| PB, 3-6 mm | 160-800 | 13-20 | 1800-2550 | 14-23 |
| MDF, ≥2.5-6 mm | 450-800 | 23-34 | 2700-3000 | 18-35 |
| HB, ≥3.5-5.5 mm | 600-1450 | 30-44 | 2500-4500 | 10-35 |
| OOFDP-PW, 2.8-4.0 mm | 1105-1397 | 17-39 | 4045-6540 | 57-183 |
| OOODP-PW, 3.3-4.2 mm | 1037-1304 | 11-30 | 2030-5523 | 54-235 |
| OOAL-PW, 2.6-3.8 mm | 1150-1376 | 22-40 | 3733-6309 | 60-148 |
| OOFDC-PW, 3.3-4.4 mm | 994-1309 | 11-37 | 2956-5623 | 63-173 |
| OOODC-PW, 3.4-4.7 mm | 965-1284 | 10-24 | 2618-4093 | 59-138 |
| SBM-PW, 3.3-3.8 mm* | 1059-1262 | 34-42 | 4511-7575 | 51-54 |

[1]abbreviations: MOR = modulus of rupture; MOE = modulus of elasticity; TS = Thickness swelling.
*Density values reported by Tisserat et at., 2017.
**Values for PB, MDF and HB obtained from EN 312 (2003), EN 622-5 (2006) and EN 622-2 (1993), respectively.

TABLE 4

OO fruit CWP color analysis. Means and standard errors are presented.

| Code | L* | a* | b* | C*ab | H* |
|---|---|---|---|---|---|
| 15OOFDP-85PW | 59 ± 1.79 | 4.2 ± 0.28 | 17.7 ± 0.26 | 18.2 ± 0.23 | 1.3 ± 0.02 |
| 25OOFDP-75PW | 45.5 ± 2.84 | 5.6 ± 0.2 | 15.4 ± 0.83 | 16.4 ± 0.82 | 1.2 ± 0.03 |
| 50OOFDP-50PW | 23.8 ± 0.39 | 2.9 ± 0.35 | 4 ± 0.33 | 5 ± 0.5 | 1 ± 0.04 |
| 15OOFDP/HEX-85PW | 56 ± 1.49 | 5 ± 0.17 | 18 ± 0.36 | 18.7 ± 0.33 | 1.3 ± 0.01 |
| 25OOFDP/HEX-75PW | 46.4 ± 2.7 | 6.2 ± 0.2 | 16 ± 0.78 | 17.1 ± 0.78 | 1.2 ± 0.02 |
| 50OOFDP/HEX-50PW | 26.5 ± 1.66 | 4.4 ± 0.7 | 6.5 ± 1.3 | 7.9 ± 1.6 | 1 ± 0.03 |
| 15OOFDP/EtOAc-85PW | 53.8 ± 1.77 | 5.3 ± 0.24 | 17.7 ± 0.31 | 18.5 ± 0.26 | 1.3 ± 0.02 |
| 25OOFDP/EtOAc-75PW | 40.3 ± 1.85 | 6.4 ± 0.24 | 14.2 ± 0.67 | 15.6 ± 0.7 | 1.1 ± 0.02 |
| 50OOFDP/EtOAc-50PW | 25.7 ± 0.63 | 4.9 ± 0.3 | 7.1 ± 0.96 | 8.7 ± 1.04 | 1 ± 0.04 |
| 15OOODP-85PW | 64.7 ± 0.73 | 3.7 ± 0.05 | 17.5 ± 0.35 | 17.9 ± 0.38 | 1.4 ± 0.01 |
| 25OOODP-75PW | 55.4 ± 2.92 | 4.2 ± 0.2 | 16.7 ± 0.65 | 17.2 ± 0.66 | 1.3 ± 0.02 |

TABLE 4-continued

OO fruit CWP color analysis. Means and standard errors are presented.

| Code | L* | a* | b* | C*ab | H* |
|---|---|---|---|---|---|
| 50OOODP-50PW | 27.8 ± 1.99 | 4.2 ± 0.53 | 7 ± 1.31 | 8.1 ± 1.53 | 1 ± 0.02 |
| 15OOODP/HEX-85PW | 61 ± 1.05 | 4.2 ± 0.09 | 18.7 ± 0.3 | 19.2 ± 0.32 | 1.3 ± 0.01 |
| 25OOODP/HEX-75PW | 55.5 ± 1.68 | 4.8 ± 0.25 | 17.1 ± 0.37 | 17.7 ± 0.44 | 1.3 ± 0.01 |
| 50OOODP/HEX-50PW | 32 ± 3.98 | 4.4 ± 0.25 | 8.9 ± 1.59 | 10 ± 1.68 | 1.1 ± 0.05 |
| 15OOODP/EtOAc-85PW | 57.4 ± 0.59 | 3.8 ± 0.08 | 16.1 ± 0.15 | 16.5 ± 0.17 | 1.3 ± 0 |
| 25OOODP/EtOAc-75PW | 47.5 ± 2.03 | 4.6 ± 0.17 | 14.7 ± 0.41 | 15.4 ± 0.4 | 1.3 ± 0.02 |
| 50OOODP/EtOAc-50PW | 31 ± 2.96 | 5 ± 0.4 | 9.5 ± 1.76 | 10.8 ± 1.89 | 1 ± 0.05 |
| 15OOAL/-85PW | 47.5 ± 0.7 | 6.3 ± 0.17 | 17.9 ± 0.18 | 19 ± 0.2 | 1.2 ± 0.01 |
| 25OOAL/-75PW | 37.9 ± 0.74 | 7 ± 0.22 | 14.9 ± 0.46 | 16.5 ± 0.54 | 1.1 ± 0.01 |
| 50OOAL/-50PW | 24.9 ± 0.34 | 4.8 ± 0.25 | 5.8 ± 0.44 | 7.5 ± 0.53 | 0.9 ± 0.02 |
| 15OOFDC-85PW | 54.1 ± 1.33 | 4.1 ± 0.11 | 15.4 ± 0.22 | 15.9 ± 0.24 | 1.3 ± 0.01 |
| 25OOFDC-75PW | 40.6 ± 2.96 | 4.5 ± 0.2 | 12.1 ± 1.18 | 12.9 ± 1.27 | 1.2 ± 0.03 |
| 50OOFDC-50PW | 24.9 ± 0.45 | 3.4 ± 0.26 | 5.3 ± 0.41 | 6.3 ± 0.53 | 1 ± 0.01 |
| 15OOFDC/EtOAc-85PW | 46.3 ± 2.28 | 5.8 ± 0.13 | 15.5 ± 0.68 | 16.6 ± 0.71 | 1.2 ± 0.02 |
| 25OOFDC/EtOAc-75PW | 37.8 ± 0.63 | 6.1 ± 0.13 | 13.2 ± 0.26 | 14.5 ± 0.31 | 1.1 ± 0.01 |
| 50OOFDC/EtOAc-50PW | 29.7 ± 1.19 | 5.6 ± 0.38 | 9.2 ± 0.83 | 10.8 ± 0.99 | 1 ± 0.02 |
| 15OOODC-85PW | 56.6 ± 0.67 | 3.8 ± 0.07 | 15.7 ± 0.15 | 16.2 ± 0.17 | 1.3 ± 0 |
| 25OOODC-75PW | 48.6 ± 1.6 | 4.2 ± 0.11 | 14.2 ± 0.3 | 14.8 ± 0.3 | 1.3 ± 0.01 |
| 50OOODC-50PW | 25.8 ± 1.72 | 3.6 ± 0.33 | 5.5 ± 0.99 | 6.6 ± 1.1 | 1 ± 0.04 |
| 15OOODC/HEX-85PW | 53.8 ± 1.11 | 3.8 ± 0.05 | 15.1 ± 0.3 | 15.6 ± 0.31 | 1.3 ± 0.01 |
| 25OOODC/HEX-75PW | 39.9 ± 1.67 | 5 ± 0.15 | 12.8 ± 0.64 | 13.7 ± 0.69 | 1.2 ± 0.02 |
| 50OOODC/HEX-50PW | 28.4 ± 1.64 | 3.7 ± 0.39 | 7.1 ± 0.95 | 8.1 ± 1.09 | 1.1 ± 0.04 |

TABLE 5

OO fruit CWP Surface Roughness Properties. Means and standard errors are presented.

| Code | Ra | Rz | Ry |
|---|---|---|---|
| 15OOFDP-85PW | 3.5 ± 0.43 | 18.2 ± 3.35 | 24.9 ± 3.75 |
| 25OOFDP-75PW | 2.1 ± 0.34 | 10.1 ± 1.48 | 16.3 ± 3.12 |
| 50OOFDP-50PW | 1.5 ± 0.09 | 6.5 ± 0.52 | 9.9 ± 0.87 |
| 15OOFDP/HEX-85PW | 2.8 ± 0.88 | 11.7 ± 3.03 | 18.7 ± 4.81 |
| 25OOFDP/HEX-75PW | 1.6 ± 0.35 | 7.7 ± 1.58 | 12 ± 2.32 |
| 50OOFDP/HEX-50PW | 1.7 ± 0.23 | 6.5 ± 0.75 | 9.9 ± 1.42 |
| 15OOFDP/EtOAc-85PW | 3.2 ± 0.28 | 17.5 ± 3.34 | 23.7 ± 2.78 |
| 25OOFDP/EtOAc-75PW | 1 ± 0.08 | 4.7 ± 0.44 | 8 ± 0.42 |
| 50OOFDP/EtOAc-50PW | 1.1 ± 0.13 | 5 ± 0.82 | 8.1 ± 1.18 |
| 15OOODP-85PW | 3.1 ± 0.64 | 15.1 ± 3.63 | 21.4 ± 4.16 |
| 25OOODP-75PW | 2.5 ± 0.25 | 10.6 ± 1.1 | 17.7 ± 2.01 |
| 50OOODP-50PW | 1.4 ± 0.09 | 6.8 ± 0.87 | 10.9 ± 1.58 |
| 15OOODP/HEX-85PW | 5.1 ± 0.28 | 22.6 ± 2.38 | 33.8 ± 2.35 |
| 25OOODP/HEX-75PW | 4.3 ± 0.57 | 19.2 ± 3.71 | 25.8 ± 3.69 |
| 50OOODP/HEX-50PW | 1.9 ± 0.37 | 10.2 ± 1.65 | 14.7 ± 2.17 |
| 15OOODP/EtOAc-85PW | 6.6 ± 0.37 | 30.4 ± 1.62 | 39.5 ± 1.35 |
| 25OOODP/EtOAc-75PW | 1.5 ± 0.27 | 7.6 ± 1.27 | 11.5 ± 1.4 |
| 50OOODP/EtOAc-50PW | 1.2 ± 0.18 | 5.8 ± 0.53 | 8.6 ± 1.09 |
| 15OOAL/-85PW | 2.2 ± 0.26 | 11.8 ± 1.77 | 16.9 ± 2.08 |
| 25OOAL/-75PW | 1.2 ± 0.15 | 7.4 ± 1.03 | 11.3 ± 1.66 |
| 50OOAL/-50PW | 1.1 ± 0.09 | 4.9 ± 0.66 | 7.7 ± 0.86 |
| 15OOFDC-85PW | 3.1 ± 0.36 | 14 ± 2.27 | 20.6 ± 2.81 |
| 25OOFDC-75PW | 2 ± 0.49 | 8.2 ± 1.77 | 12.6 ± 2.54 |
| 50OOFDC-50PW | 1.2 ± 0.1 | 5.4 ± 0.44 | 8.4 ± 0.5 |
| 15OOFDC/EtOAc-85PW | 2.2 ± 0.25 | 11.3 ± 1.97 | 16.2 ± 1.56 |
| 25OOFDC/EtOAc-75PW | 1.3 ± 0.06 | 7.2 ± 0.74 | 11 ± 0.72 |
| 50OOFDC/EtOAc-50PW | 1.2 ± 0.1 | 4.3 ± 0.32 | 7.3 ± 0.51 |
| 15OOODC-85PW | 4.7 ± 0.52 | 20.6 ± 2.12 | 30.9 ± 2.9 |
| 25OOODC-75PW | 2.8 ± 0.19 | 12.8 ± 1.91 | 19.7 ± 2.04 |
| 50OOODC-50PW | 1.4 ± 0.16 | 6.3 ± 1.02 | 9.4 ± 1.11 |
| 15OOODC/HEX-85PW | 2.9 ± 0.39 | 14.4 ± 2.55 | 21.3 ± 2.96 |
| 25OOODC/HEX-75PW | 1.1 ± 0.19 | 5.1 ± 0.53 | 8.5 ± 0.95 |
| 50OOODC/HEX-50PW | 1.5 ± 0.18 | 7.6 ± 1.51 | 12.1 ± 2.29 |

TABLE 6

CWPs physical, flexural and dimensional properties prepared employing OO fruit and Soybean flour (Prolia-PRO) adhesives and Wood fibers (PW)[1].

| Description | Thickness | SE | Density | SE | MOR | SE | MOE | SE | WA | SE | TS | SE |
|---|---|---|---|---|---|---|---|---|---|---|---|---|
| 15PRO-85PW | 3.7 | 0.05 | 1170 | 19 | 34 | 1.65 | 5095 | 254 | 56 | 7 | 66 | 5 |
| 15OOFDP/HEX-85PW | 3.9 | 0.05 | 1108 | 24 | 28.1 | 0.94 | 5390 | 225 | 173 | 2 | 187 | 4 |
| 15OOFDP/HEX-PRO-85PW | 4.4 | 0.12 | 997 | 32 | 22.7 | 1.81 | 4113 | 417 | 126 | 9 | 96 | 2 |
| 50PRO-50PW | 3.37 | 0.1 | 1263 | 17 | 33 | 0.95 | 5885 | 219 | 52 | 4 | 55 | 2 |
| 50OOFDP/HEX-50PW | 3.1 | 0.04 | 1320 | 9 | 27.8 | 0.89 | 4872 | 74 | 59 | 5 | 73 | 7 |
| 50OOFDP/HEX-PRO-50PW | 3.3 | 0.03 | 1277 | 33 | 36.8 | 1.12 | 6211 | 196 | 38 | 4 | 48 | 2 |

| Description | Thickness | SE | Density | SE | MOR | SE | MOE | SE | WA | SE | TS | SE |
|---|---|---|---|---|---|---|---|---|---|---|---|---|
| 15PRO-85PW | 3.7 | 0.05 | 1170 | 19 | 34 | 1.65 | 5095 | 254 | 56 | 7 | 66 | 5 |
| 15OOFDC-85PW | 4.0 | 0.09 | 1080 | 21 | 23.5 | 1.21 | 4404 | 281 | 180 | 3 | 182 | 4 |
| 15OOFDC/HEX-PRO-85PW | 4.6 | 0.09 | 951 | 23 | 18.4 | 2.08 | 3210 | 377 | 132 | 6 | 102 | 1 |
| 50PRO-50PW | 3.37 | 0.1 | 1263 | 17 | 33 | 0.95 | 5885 | 219 | 52 | 4 | 55 | 2 |

TABLE 6-continued

CWPs physical, flexural and dimensional properties prepared employing OO fruit and Soybean flour (Prolia-PRO) adhesives and Wood fibers (PW)[1].

| 50OOFDC-50PW | 3.3 | 0.02 | 1289 | 19 | 36.1 | 1.01 | 6811 | 246 | 60 | 6 | 45 | 35 |
| 50OOFDC/HEX-PRO-50PW | 3.3 | 0.03 | 1288 | 13 | 34.6 | 1.03 | 6014 | 123 | 35 | 1 | 45 | 2 |

[1]abbreviations:
MOR = modulus of rupture;
MOE = modulus of elasticity;
WA = water absorption;
TS = Thickness swelling;
SE = Standard error.

TABLE 7

Percentage comparisons of CWPs physical, flexural and dimensional properties prepared employing OO fruit (and Soybean flour (Prolia-PRO) adhesives and Wood fibers (PW)[1]. Percent change difference is calculated for OO fruit and Hybird OO fruit/PRO CWPs compared to PRO CWPs.

| Description | Thickness | % | Density | % | MOR | % | MOE | % | WS | % | TA | % |
|---|---|---|---|---|---|---|---|---|---|---|---|---|
| 15PRO-85PW | 3.65 | 0 | 1170 | 0.0 | 34 | 0.0 | 5095 | 0.0 | 56 | 0.0 | 66 | 0.0 |
| 15OOFDP/HEX-85PW | 3.9 | 6.1 | 1108 | −5.3 | 28.1 | −17.3 | 5390 | 5.8 | 173 | 207.2 | 187 | 180.9 |
| 15OOFDP/HEX-PRO-85PW | 4.4 | 20.5 | 997 | −14.8 | 22.7 | −33.2 | 4113 | −19.3 | 126 | 124.1 | 96 | 44.4 |
| 50PROLIA-50PW | 3.37 | 0.0 | 1263 | 0.0 | 33 | 0.0 | 5885 | 0.0 | 52 | 0.0 | 55 | 0.0 |
| 50OOFDP/HEX-50PW | 3.1 | −6.9 | 1320 | 4.5 | 27.8 | −15.7 | 4872 | −17.2 | 59 | 14.5 | 73 | 32.1 |
| 50OOFDP/HEX-PRO-50PW | 3.3 | −2.1 | 1277 | 1.1 | 36.8 | 11.5 | 6211 | 5.5 | 38 | −26.4 | 48 | −12.6 |
| Description | Thickness | % | Density | % | MOR | % | MOE | % | WS | % | TA | % |
| 15PRO-85PW | 3.65 | 0 | 1170 | 0 | 34 | 0 | 5095 | 0 | 56 | 0 | 66 | 0 |
| 15OOFDC-85PW | 4.0 | 10.5 | 1080 | −7.7 | 23.5 | −30.9 | 4404 | −13.6 | 180 | 219.4 | 182 | 174.4 |
| 15OOFDC/HEX-PRO-85PW | 4.6 | 26.0 | 951 | −18.7 | 18.4 | 45.9 | 3210 | 37.0 | 132 | 134.8 | 102 | 53.5 |
| 50PROLIA-50PW | 3.37 | 0.0 | 1263 | 0.0 | 33 | 0.0 | 5885 | 0.0 | 52 | 0.0 | 55 | 0.0 |
| 50OOFDC-50PW | 3.3 | −2.7 | 1289 | 2.0 | 36.1 | 9.5 | 6811 | 15.7 | 60 | 16.9 | 45 | −18.2 |
| 50OOFDC/HEX-PRO-50PW | 3.3 | −2.1 | 1288 | 2.0 | 34.6 | 4.8 | 6014 | 2.2 | 35 | −32.2 | 45 | −18.0 |

[1]abbreviations:
MOR = modulus of rupture;
MOE = modulus of elasticity;
WA = water absorption;
TS = Thickness swelling;
SE = Standard error.

We claim:

1. An adhesive powder comprising at least one of:
   dried milled Osage orange fruit; or
   ground fruit material remaining after extracting dried milled Osage orange fruit with an organic solvent; or
   ground fruit material remaining after extracting dried milled Osage orange fruit with a polar aprotic solvent; or
   ground material from the amorphous layer formed between the polar aprotic solvent and the polar aprotic solvent-extracted dried milled Osage orange fruit; or
   a combination thereof;
   wherein the adhesive powder optionally comprises a known adhesive.

2. The adhesive powder of claim 1, wherein the Osage orange fruit is Osage orange inner core portion or Osage orange outer peel portion.

3. The adhesive powder of claim 1, wherein the organic solvent is hexane.

4. The adhesive powder of claim 1, wherein the polar aprotic solvent is ethyl acetate.

5. An adhesive product comprising the adhesive powder of claim 1.

* * * * *